United States Patent
Tomack et al.

(10) Patent No.: US 6,707,461 B1
(45) Date of Patent: Mar. 16, 2004

(54) BLENDING OBJECTS WITH DIFFERENT EFFECT PARAMETERS

(75) Inventors: Darin Tomack, Fremont, CA (US); Paul J. Asente, La Honda, CA (US); Frank Guinan, Mountain View, CA (US); Teri Pettit, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/468,729

(22) Filed: Dec. 21, 1999

(51) Int. Cl.$^7$ ................................................. G09G 5/00
(52) U.S. Cl. ........................................ 345/611; 382/269
(58) Field of Search ............................... 345/619, 611, 345/621, 612, 629, 613–618, 441, 589, 646, 641, 620, 660, 672, 419, 420, 473, 582, 643, 801; 707/526, 517, 509, 506; 428/195; 40/437, 453, 476; 382/162–167, 269, 274–284

(56) References Cited

U.S. PATENT DOCUMENTS

| | | | | |
|---|---|---|---|---|
| 4,791,489 A | * | 12/1988 | Polatnick | 348/578 |
| 4,924,299 A | | 5/1990 | Mizuno et al. | 348/721 |
| 5,261,041 A | * | 11/1993 | Susman | 345/473 |
| 5,315,390 A | | 5/1994 | Windrem | 348/584 |
| 5,649,220 A | * | 7/1997 | Yosefi | 715/526 |
| 5,748,881 A | * | 5/1998 | Lewis et al. | 714/47 |
| 5,751,283 A | * | 5/1998 | Smith | 345/798 |
| 5,873,106 A | * | 2/1999 | Joseph | 707/506 |
| 5,874,967 A | | 2/1999 | West et al. | 345/629 |
| 5,892,521 A | | 4/1999 | Blossom et al. | 345/501 |
| 5,926,185 A | * | 7/1999 | Vyncke et al. | 345/619 |
| 5,937,104 A | | 8/1999 | Henderson et al. | 382/279 |
| 6,028,583 A | | 2/2000 | Hamburg | 345/629 |
| 6,038,031 A | * | 3/2000 | Murphy | 382/254 |
| 6,101,289 A | * | 8/2000 | Kellner | 382/276 |
| 6,133,922 A | * | 10/2000 | Opitz | 345/420 |
| 6,229,550 B1 | * | 5/2001 | Gloudemans et al. | 345/641 |
| 6,271,859 B1 | * | 8/2001 | Asente | 345/589 |
| 6,469,710 B1 | * | 10/2002 | Shum et al. | 345/619 |

FOREIGN PATENT DOCUMENTS

EP  0 564 247 A1  10/1993

OTHER PUBLICATIONS

Adobe After Effects 4.1SDK, Software Development Kit, Release 2 Windows and Macintosh, Revised pp. 1–52 (Sep. 1999).

Adobe, Adobe After Effects User Guide, Oct. 1995, pp. 137–191, 323–342.

* cited by examiner

*Primary Examiner*—Michael Razavi
*Assistant Examiner*—Thu-Thao Havan
(74) *Attorney, Agent, or Firm*—Fish & Richardson P.C.

(57) ABSTRACT

A method of blending artwork objects. In the method, user input is received selecting a first parameter setting and a second parameter setting for an effect on an object. The first parameter setting, the second parameter setting and a blend parameter setting are passed to the effect. A third parameter setting is generated in the effect from the first parameter setting, the second parameter setting and the blend parameter setting. The effect is applied to the object with the third parameter setting to generate an rendered version of the object.

18 Claims, 2 Drawing Sheets

BLENDING OBJECTS WITH DIFFERENT EFFECT PARAMETERS

BACKGROUND

The present invention relates to the application of effects to artwork objects in a graphics program.

Conventional graphic illustration and animation programs allow users to apply effects to artwork objects in order to modify the visual appearance of the objects. Each effect is typically controlled by the settings of one or more parameters. For example, a skew effect would be controlled by a parameter that sets the skew angle. Some graphic illustration programs permit a user to morph or blend with an applied effect between two forms of the object generated from two different parameters settings. One conventional method of blending is to apply the effect with the first parameter setting to the object to create a first drawing, apply the affect with the second parameter to the object to create a second drawing, and interpolate between the two to create a blended version of the two drawings. This method is performed by the Adobe Illustrator® application. Another conventional method of blending is for the graphics application to interpolate the effect's parameter settings. For example, the application can calculate a linear interpolation between the two parameter settings of the effect, and apply the effect using the linear interpolation. This method is used for raster filter effects by the Adobe AfterEffects® application.

Unfortunately, the conventional methods of blending do not function properly when some vector effects are applied to vector objects. For example, if the object is a square and the effect is a rotation of 90°, and the blending interpolates between one version of the object with the rotation and one version of the object without the rotation, the resulting blend will be just a copy of the original object rather than a rotation of the square through an intermediate angle. An additional problem is that having the application interpolate the parameter settings for an effect may require elaborate parameter descriptions.

SUMMARY

In one aspect, the invention is directed to a method of editing an artwork object. In the method, user input is received selecting a first parameter setting and a second parameter setting for an effect of an object. The first parameter setting, the second parameter setting and a blend parameter setting are passed to the effect. A third parameter setting is generated in the effect from the first parameter setting, the second parameter setting and the blend parameter setting. The effect is applied to the object with the third parameter setting to generate an rendered version of the object.

Implementations of the invention may include the following features. The effect may be a vector effect. The third parameter setting may be between the first and second parameter settings. The first parameter setting and second parameter setting may be for the same parameter.

In another aspect, the invention is directed to a method of performing a blend on an artwork object. In the method, user input is received selecting a first parameter setting for a first effect on an object, a second parameter setting for a second effect on the object, a third parameter setting for the first effect on the object, and a fourth parameter setting for the second effect on the object. The first parameter setting, the third parameter setting and a blend parameter setting are passed to the first effect, and a fifth parameter setting is generated in the first effect from the first parameter setting, the third parameter setting and the blend parameter setting. The second parameter setting, the fourth parameter setting and the blend parameter setting are passed to the second effect, and a sixth parameter setting is generated in the second effect from the second parameter setting, the fourth parameter setting and the blend parameter setting. The first effect is applied to the object with the fifth parameter setting to generate a first intermediate object, and the second effect is applied the first intermediate object with the sixth parameter setting to generate a second intermediate object.

In another aspect, the invention is directed to a method of editing an artwork object. In the method, user input is received selecting a first parameter setting for an effect of a first artwork object and selecting a second parameter setting for an effect of a second artwork object. The first parameter setting, the second parameter setting and a blend parameter setting are passed to the effect, and a third parameter setting is generated in the effect from the first parameter setting, the second parameter setting and the blend parameter setting. The effect is applied to the first object with the third parameter setting to generate a first intermediate object, and the effect is applied to the second object with the third parameter setting to generate a second intermediate object. Interpolation between the first intermediate object and the second intermediate object generates a third intermediate object.

In another aspect, the invention is directed to a method for implementing an effect for application to an artwork object in a graphic arts computer program application. In the method, a programming interface is provided in a computer program module implementing an effect for receiving a parameter value range and a blend parameter value. The parameter value range defines first and second endpoint values for the effect parameter, and the blend parameter value defines a selection of an effect parameter value from the first endpoint through the second endpoint, inclusive. The effect parameter value controls operation of the effect when the effect is applied to an artwork object.

Implementations of the invention may include the following features. A programming interface may be provided in the computer program module for returning to the application an intermediate parameter value for the effect parameter. The intermediate parameter value may be calculated by the module from the parameter value range and the blend parameter value. A programming interface may be provided in the computer program module for the application to direct the effect to apply itself with an effect parameter value calculated by the effect from the parameter value range and the blend parameter value. The blend parameter may represent a percentage between zero percent and 100 percent, inclusive. The effect may be a vector effect. The effect may have multiple effect parameters, and the programming interface may be operable to receive multiple effect parameter values and corresponding multiple parameter value ranges, the blend parameter value defining a selection of a respective parameter value for each of the multiple effect parameters.

In another aspect, the invention may be directed to a computer program product tangibly stored on a computer-readable medium and implementing the foregoing methods.

Advantages of the invention may include the following. A larger variety of effects, including vector effects, may be blended. The blending need not follow a simple linear interpolation.

DETAILED DESCRIPTION

Figure 1:
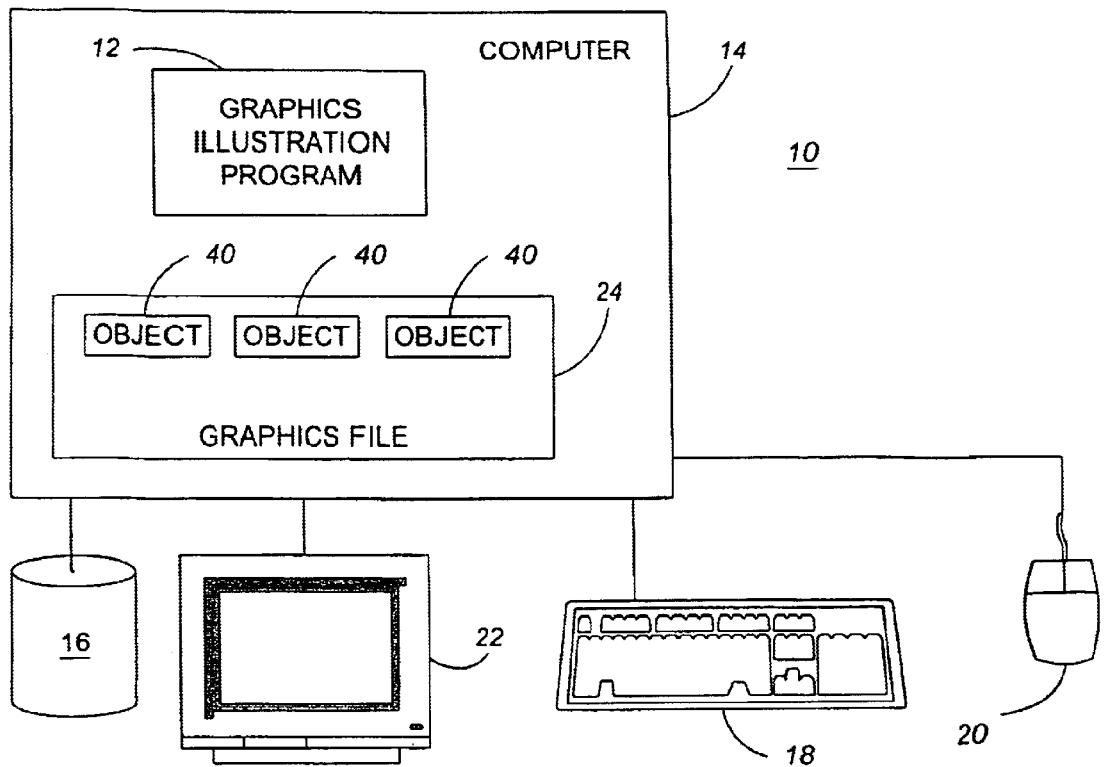
FIG. 1 is a block diagram of a computer system that can be used to perform a blending procedure in accordance with the invention.

As shown in FIG. 1, a computer-implemented graphics system 10 includes a general purpose programmable digital computer 14 (such as a personal computer or workstation), a mass storage device 16 (such as a magnetic, optical or magneto-optical disk drive), a keyboard 18, a pointer device 20 (such as a mouse), and a display 22. The computer 14 is of conventional construction, and includes a processor capable of executing computer program instructions, and a memory for storing programs and data. The computer 14 executes a graphics illustration program 12. In general, the graphics illustration program 12 manipulates a graphics file 24 that includes one or more artwork objects 40. The computer graphics system 10 can also include communications hardware and software by which the computer 14 is connected to other computer systems over a network, such as intranet or the Internet. Although illustrated as an individual computer, the computer graphics system 10 can be implemented on a computer network, and the data and programs by the computer-implemented graphics system 10 can be distributed on separate computers.

The method can be performed by a computer program that may be implemented in hardware, firmware, software, or combinations thereof, and the program can be tangibly embodied in any sort of computer readable storage device, such as volatile and non-volatile memory, including semiconductor memory devices, magnetic disks, magneto-optical disks, and optical disks.

Figure 2:
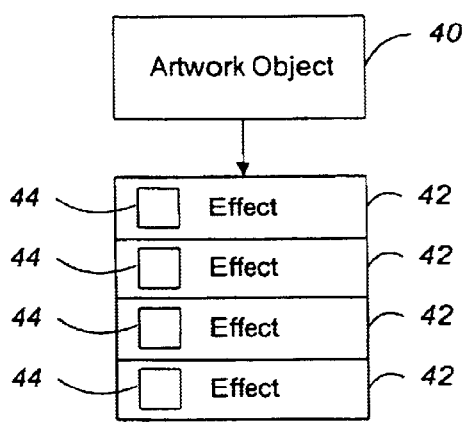
FIG. 2 is a block diagram of a data structure for an artwork object.

As shown in FIG. 2, each artwork object 40 can have one or more effects 42 attached or applied to it, and each effect 42 can have one or more effect parameters 44. The operation of each effect 42 is controlled by the settings of the effect parameters 44 associated with the effect 42. Where multiple effects are attached to an object, the effects are applied in series in an order that can be determined by the user or in a default order. Thus, the rendered appearance of an object depends not only on the effects and their associated parameter settings, but the order in which the effects are applied.

Users often desire to create a blend between two objects. A blend can create either a single intermediate object or a series of intermediate objects (e.g., to generate a series of images that morph between the appearance of the first and second objects). A blend is controlled by a blend parameter, e.g., a percentage that determines the relative contributions of the first and second objects to the intermediate object.

Figure 3:
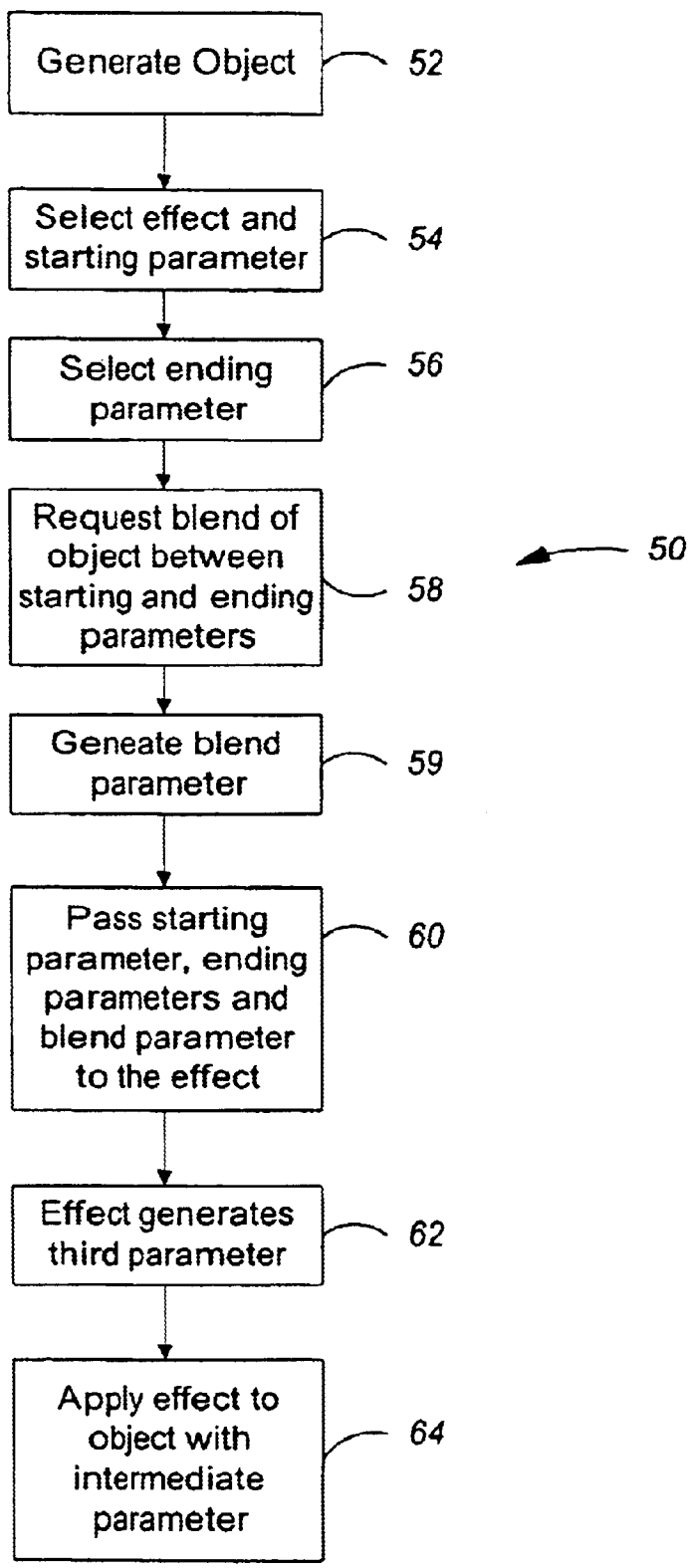
FIG. 3 is a flow diagram of a method of blending two versions of an object having different parameters.

FIG. 3 shows a method 50 to perform a blend between two objects with graphics illustration program 12. In the initial example, the two objects are versions of the same object having an effect with two different effect parameter settings. However, as explained below, the procedure is generally applicable between any two objects. Initially, the user generates an object, e.g., by dragging the object from a toolbar and selecting properties and attributes from a menu (step 52). The user then selects an effect to apply to the object and selects a start setting for the effect parameter (step 54). Then the user creates a second version of the object by selecting an end setting for the effect parameter (step 56). The starting and ending parameter settings represent the two endpoint versions of the object, and can be different values of a single parameter that controls the effect. Next, the user requests that the application perform a blend (step 58). A setting for the blend parameter is generated by receiving a user input or automatically by the application (step 59).

When the user requests that the application perform a blend, the start and end settings for the effect parameter and the setting for the blend parameter are passed to the effect (step 60). In response, the effect generates a blended effect setting for the effect parameter (step 62). Unlike conventional illustration systems in which blending is performed by the application with an interpolation between the objects that result from applying two different effects to the original object, the illustration program 12, in essence, interpolates its own parameters. That is, each effect includes a procedure or module that can calculate a single blended effect setting for the effect parameter based on the two endpoint settings (the staring and ending settings) for the effect parameter and the setting of the blending parameter. Once the blended effect setting has been generated, the effect is applied to generate a new artwork object (step 62), thus completing the blend.

The calculation of the blended effect setting can be performed entirely inside the effect as the effect is applied. The blended effect setting need not be passed back to the application in order to apply the effect to the object. In essence, each parameter of an effect can receive three settings, including a start, end and blend setting. In combination, these three settings provide the same results as if the user had directly entered the blended effect setting for the effect parameter when creating the object.

The calculation procedure can be selected so that if the effect is applied to the object with the new parameter settings, the resulting object has an appearance intermediate the two endpoint objects. For example, a rotational effect can include a procedure that would accept two input angles and a blending percentage. The rotational effect would then calculate an intermediate angle based on the blending percentage that falls between the two input angles. This permits blending of effects that otherwise could not be interpolated. Although the calculation of the blended effect setting can be based on a linear interpolation between the start and end settings, more complex calculations can be performed.

The method is also applicable if the parameter settings vary across multiple parameters, e.g., if an effect is controlled by multiple parameters. In this case, the user will select starting and ending settings for each parameter. The effect calculates a blended effect setting for each parameter that governs the effect.

If the user desires to create a series of intermediate objects, a series of blend parameter settings can be passed to the effect, and the effect can calculate a series of blended effect settings for the effect parameter. To generate the first intermediate object, the effect is applied to the object with the first blended effect setting in the series. Then, the effect is reapplied to the original object with the second blended effect setting in the series to generate the second intermediate object, the effect is reapplied to the original object with the third blended effect setting to generate the third intermediate object, and so on.

More generally, the application can blend between objects that have multiple effects. In this situation, the entire blend can be controlled with a single blending parameter. The setting for the blending parameter is passed to each effect in turn, and each effect generates its own blended effect setting or series of blended effect settings. To create an initial intermediate object, the effects are applied in order with their associated blended effect settings. A similar process is used to create a series of intermediate objects. Specifically, the user or the application generates a series of blending parameter settings. To create the first intermediate object, the first blend parameter setting in the series is passed to each effect. Each effect generates a first blended effect setting, and the effects are applied in order using the first blended effect settings. To create the second intermediate object, the second blend parameter setting in the series is passed to each effect. Each effect generates a second blended effect setting, and the effects are applied again to the original object, in order, using the second blended effect settings.

Most effects will have a parameter setting (which will be called a "null" value) at which the application of the effect does not change the rendered appearance object. For example, zero degrees is a null value for a rotation effect. For such effects, two objects in the same class (e.g., ellipses or rectangles) that have different effects (e.g., rotation and skew) can still be considered as versions of the same object. Specifically, the first object can be considered to have the effect on the second object set with a null value, and the second object can be considered to have the effect on the first object set with a null value. In one implementation, the application can determine the total set of effects that are applied to both objects. The common effects are not changed. However, each effect that is applied to only one of the objects is treated as being applied to the other object with a null value. Blending between the two objects can then proceed as described above for blending between objects with multiple effects, with the one endpoint of the effect having the parameter set to the null value.

In some cases, two objects that have an effect with different parameters cannot be considered to be versions of the same object. This typically occurs when the objects include different numbers or types of control points. For example, a user may request a blending between an ellipse rotated by ninety degrees and a rectangle rotated by forty-five degrees. In these cases, the starting setting of the effect parameter can be taken from one object, the ending setting for the effect parameter can be taken from the second object, and the effect can generate a blended effect parameter setting based on the starting and ending setting of the effect parameter and the setting of the blending parameter. The effect can be applied with the blended effect setting to each object to create two modified objects. Finally, the application can interpolate between the two modified objects to create the final rendered image.

What is claimed is:

1. A method of performing a blend on an artwork object, comprising:

receiving user input selecting a first parameter setting for a first effect on an object and a second parameter setting for a second effect on the object;

receiving user input selecting a third parameter setting for the first effect on the object and a fourth parameter setting for the second effect on the object;

passing the first parameter setting, the third parameter setting and a blend parameter setting to the first effect;

generating a fifth parameter setting in the first effect from the first parameter setting, the third parameter setting and the blend parameter setting;

applying the first effect to the object with the fifth parameter setting to generate a first intermediate object;

passing the second parameter setting, the fourth parameter setting and the blend parameter setting to the second effect;

generating a sixth parameter setting in the second effect from the second parameter setting, the fourth parameter setting and the blend parameter setting; and applying the second effect to the first intermediate object with the sixth parameter setting to generate a second intermediate object.

2. A method of editing an artwork object, comprising:

receiving user input selecting a first parameter setting for an effect of a first artwork object;

receiving user input selecting a second parameter setting for an effect of a second artwork object;

passing the first parameter setting, the second parameter setting and a blend parameter setting to the effect;

generating a third parameter setting in the effect from the first parameter setting, the second parameter setting and the blend parameter setting;

applying the effect to the first object with the third parameter setting to generate a first intermediate object;

applying the effect to the second object with the third parameter setting to generate a second intermediate object; and interpolating between the first intermediate object and the second intermediate object to generate a third intermediate object.

3. A method for implementing an effect for application to an artwork object in a graphic arts computer program application, the method comprising:

providing, in a computer program module implementing an effect, a programming interface for receiving a parameter value range and a blend parameter value, the parameter value range defining first and second endpoint values for the effect parameter, and the blend parameter value defining a selection of an effect parameter value from the first endpoint through the second endpoint, inclusive, the effect parameter value controlling operation of the effect when the effect is applied to an artwork object.

4. The method of claim 3, further comprising:

providing in the computer program module a programming interface for returning to the application an intermediate parameter value for the effect parameter, the intermediate parameter value being calculated by the module from the parameter value range and the blend parameter value.

5. The method of claim 3, further comprising providing in the computer program module a programming interface for the application to direct the effect to apply itself with an effect parameter value calculated by the effect from the parameter value range and the blend parameter value.

6. The method of claim 3, wherein the blend parameter represents a percentage between zero percent and 100 percent, inclusive.

7. The method of claim 3, wherein the effect is a vector effect.

8. The method of claim 3, wherein the effect has multiple effect parameters, and the programming interface is operable to receive multiple effect parameter values and corresponding multiple parameter value ranges, the blend parameter value defining a selection of a respective parameter value for each of the multiple effect parameters.

9. A computer program product tangibly stored on a computer-readable medium and implementing an effect for application to an artwork object in a graphic arts computer program, the module comprising instructions operable to cause a programmable processor to:

provide a programming interface for the effect to receive a parameter value range and a blend parameter value, the parameter value range defining first and second endpoint values for the effect parameter, and the blend parameter value defining a selection of an effect parameter value from the first endpoint through the second endpoint, inclusive, the effect parameter value controlling operation of the effect when the effect is applied to an artwork object.

10. A computer program product, tangibly stored on a computer-readable medium, the product comprising instructions operable to cause a programmable processor to:

receive user input selecting a first parameter setting for a first effect on an object and a second parameter setting for a second effect on the object;

receive user input selecting a third parameter setting for the first effect on the object and a fourth parameter setting for the second effect on the object;

pass the first parameter setting, the third parameter setting and a blend parameter setting to the first effect;

generate a fifth parameter setting in the first effect from the first parameter setting, the third parameter setting and the blend parameter setting;

apply the first effect to the object with the fifth parameter setting to generate a first intermediate object;

pass the second parameter setting, the fourth parameter setting and the blend parameter setting to the second effect;

generate a sixth parameter setting in the second effect from the second parameter setting, the fourth parameter setting and the blend parameter setting; and apply the second effect to the first intermediate object with the sixth parameter setting to generate a second intermediate object.

11. A computer program product, tangibly stored on a computer-readable medium, the product comprising instructions operable to cause a programmable processor to:

receive user input selecting a first parameter setting for an effect of a first artwork object;

receive user input selecting a second parameter setting for an effect of a second artwork object;

pass the first parameter setting, the second parameter setting and a blend parameter setting to the effect;

generate a third parameter setting in the effect from the first parameter setting, the second parameter setting and the blend parameter setting;

apply the effect to the first object with the third parameter setting to generate a first intermediate object;

apply the effect to the second object with the third parameter setting to generate a second intermediate object; and interpolate between the first intermediate object and the second intermediate object to generate a third intermediate object.

12. A computer program product, tangibly stored on a computer-readable medium, the product comprising instructions operable to cause a programmable processor to:

provide, in a computer program module implementing an effect, a programming interface for receiving a parameter value range and a blend parameter value, the parameter value range defining first and second endpoint values for the effect parameter, and the blend parameter value defining a selection of an effect parameter value from the first endpoint through the second endpoint, inclusive, the effect parameter value controlling operation of the effect when the effect is applied to an artwork object.

13. The product of claim 12, further comprising instructions operable to cause data processing apparatus to:

provide in the computer program module a programming interface for returning to the application an intermediate parameter value for the effect parameter, the intermediate parameter value being calculated by the module from the parameter value range and the blend parameter value.

14. The product of claim 12, further comprising instructions operable to cause data processing apparatus to:

provide in the computer program module a programming interface for the application to direct the effect to apply itself with an effect parameter value calculated by the effect from the parameter value range and the blend parameter value.

15. The product of claim 12, wherein:

the blend parameter represents a percentage between zero percent and 100 percent, inclusive.

16. The product of claim 12, wherein:

the effect is a vector effect.

17. The product of claim 12, wherein:

the effect has multiple effect parameters, and the programming interface is operable to receive multiple effect parameter values and corresponding multiple parameter value ranges, the blend parameter value defining a selection of a respective parameter value for each of the multiple effect parameters.

18. A computer-implemented method, comprising:

providing a programming interface for the effect to receive a parameter value range and a blend parameter value, the parameter value range defining first and second endpoint values for the effect parameter, and the blend parameter value defining a selection of an effect parameter value from the first endpoint through the second endpoint, inclusive, the effect parameter value controlling operation of the effect when the effect is applied to an artwork object.

* * * * *